United States Patent
Nguyen et al.

(10) Patent No.: US 11,727,118 B2
(45) Date of Patent: Aug. 15, 2023

(54) VEHICLE VULNERABILITY TESTING

(71) Applicant: THE BOEING COMPANY, Chicago, IL (US)

(72) Inventors: Daniel Nguyen, Auburn, WA (US); Michael Robert Vanguardia, Kent, WA (US); Steven Im, Lynnwood, WA (US); Alecsander Brian Clairmont, Seattle, WA (US); Thomas E. Eggerding, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 537 days.

(21) Appl. No.: 16/678,743

(22) Filed: Nov. 8, 2019

(65) Prior Publication Data

US 2021/0141905 A1 May 13, 2021

(51) Int. Cl.
*G06F 21/57* (2013.01)
*G06F 9/54* (2006.01)

(52) U.S. Cl.
CPC .............. *G06F 21/577* (2013.01); *G06F 9/54* (2013.01); *G06F 2221/034* (2013.01)

(58) Field of Classification Search
CPC .................................................... G06F 21/577
USPC ........................................................ 726/25
See application file for complete search history.

(56) References Cited

U.S. PATENT DOCUMENTS

| | | | |
|---|---|---|---|
| 10,248,522 B1 | 4/2019 | Cain | |
| 10,728,265 B2 * | 7/2020 | Hayden | G06F 21/552 |
| 2014/0280157 A1 * | 9/2014 | Chen | G06Q 30/0271 |
| | | | 707/737 |
| 2018/0037122 A1 * | 2/2018 | Croset | B60L 53/53 |
| 2018/0367553 A1 | 12/2018 | Hayden et al. | |

FOREIGN PATENT DOCUMENTS

| | | |
|---|---|---|
| CN | 109145579 A | 1/2019 |
| GB | 2490006 B | 7/2013 |

OTHER PUBLICATIONS

Extended European Search Report for Application No. 20205085.2 dated Feb. 8, 2021, 9 pgs.
Siboni, Shachar, et al., "Security Testbed for Internet-of-Things Devices," IEEE Transactions on Reliability, vol. 68, No. 1, Mar. 2019, pp. 23-44.
Communication from the European Patent Office Examining Division, Application No. 20205085.2, dated Feb. 8, 2023.

* cited by examiner

*Primary Examiner* — Anthony D Brown
(74) *Attorney, Agent, or Firm* — Jordan IP Law, LLC

(57) ABSTRACT

A testing device includes a first interface device configured to enable communication with a first component of a vehicle and a second interface device configured to enable communication with a second component of the vehicle. The testing device includes a test module storage configured to store one or more test modules and also includes a user interface and a test controller. The test controller is responsive to the user interface to select a test module from the test module storage and to cause the first interface device to communicate first test data to the first component of the vehicle and to cause the second interface device to communicate second test data to the second component of the vehicle to perform a vulnerability test associated with the selected test module.

20 Claims, 8 Drawing Sheets

VEHICLE VULNERABILITY TESTING

FIELD

The present disclosure is generally related to testing vehicle components for vulnerabilities.

BACKGROUND

Cybersecurity vulnerability testing is typically performed on electronic components and systems that may be subject to electronic attacks. For example, penetration attacks include attempts to inject maliciously crafted software payloads into the electronic components to cause remote code execution or to cause the electronic components to become unavailable or offline.

SUMMARY

In a particular implementation, a testing device includes a first interface device configured to enable communication with a first component of a vehicle and a second interface device configured to enable communication with a second component of the vehicle. The testing device includes a test module storage configured to store one or more test modules. The testing device also includes a user interface and a test controller. The test controller is responsive to the user interface to select a test module from the test module storage and to cause the first interface device to communicate first test data to the first component of the vehicle and to cause the second interface device to communicate second test data to the second component of the vehicle to perform a vulnerability test associated with the selected test module.

In another particular implementation, a method of vehicle testing includes selecting, at a testing device, a test module that is executable by the testing device to perform, via multiple interface devices, a vulnerability test of one or more components of a vehicle. The method also includes executing, at the testing device, the test module to perform the vulnerability test, where the vulnerability test includes communicating test data, via one or more of the multiple interface devices, to the one or more components of the vehicle.

In another particular implementation, a computer-readable storage device includes instructions, that when executed, cause one or more processors to perform operations. The operations include selecting a test module that is executable to perform, via multiple interface devices, a vulnerability test of one or more components of a vehicle. The operations also include executing the test module to perform the vulnerability test, where the vulnerability test includes communicating test data, via one or more of the multiple interface devices, to the one or more components of the vehicle.

The features, functions, and advantages described herein can be achieved independently in various implementations or may be combined in yet other implementations, further details of which can be found with reference to the following description and drawings.

DETAILED DESCRIPTION

Figure 1:
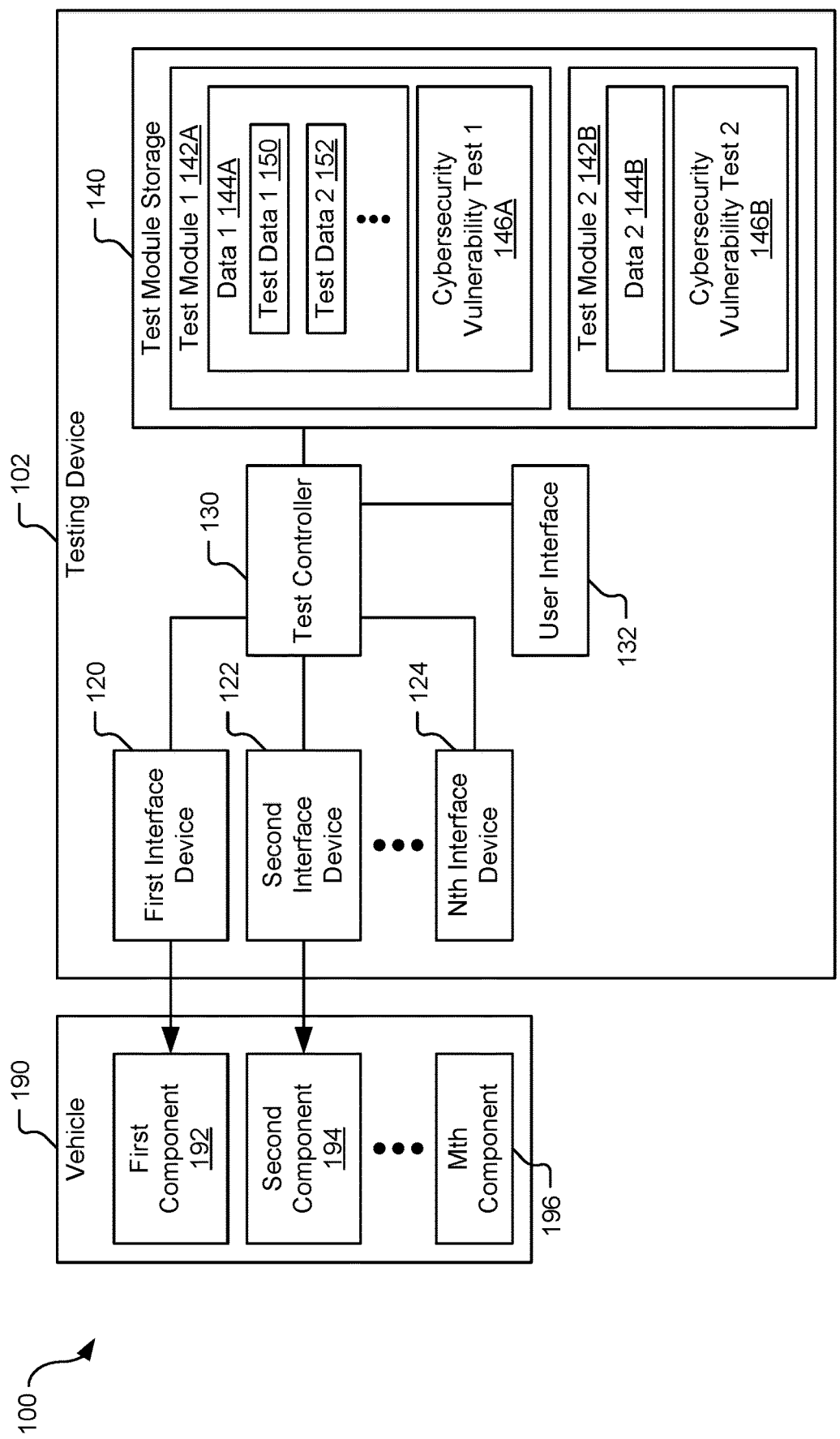
FIG. 1 is a diagram that illustrates a system that includes a testing device configured to perform vulnerability testing of a vehicle in accordance with an embodiment.

Aspects disclosed herein include systems and methods for testing of electronic components such as those found in vehicles. A testing device includes multiple communication interfaces configured to inject messages on various busses and media of the electronic components, such as serial busses and other wired and wireless communication channels. According to various aspects, the testing device is vehicle and platform independent (i.e., the testing device can be used or reused on different vehicles). In some examples the systems use a central repository coupled to a publication or subscription model to distribute tests of known threats and countermeasures. In some implementations, a testing system that includes the testing device provides continuously updated testing information while reducing (e.g., eliminating) the need for operator intervention in updating testing software.

In some implementations, the testing device operates as a hardware aircraft interface device that injects messages (e.g., test data) to one or more components of an aircraft via various aircraft-specific communication buses, such as an avionics bus that operates according to an Aeronautical Radio, Inc. (ARINC) 429-type data transfer standard ("ARINC" is a registered trademark of ARINC Incorporated of Annapolis, Md.), a military standard 1553 (MIL-SPEC-1553) serial data bus standard, one or more other communication standards, or any combination thereof, as illustrative, non-limiting examples. According to various implementations, the testing device is configured to perform testing on components during production of an aircraft, to perform post-production operational platform testing, to perform testing of one or more components at a testbench in a laboratory setting, or any combination thereof.

A technical effect of the disclosed testing systems and techniques is to enable uniformity of testing on various types of commercial airplanes using a testing device. In certain examples the testing systems may be used in certification, for example, for Federal Aviation Administration (FAA)-type certification and attestation and to provide a method to re-baseline (e.g., to re-perform cybersecurity or functional testing of) aircraft or aircraft components. In accordance with some aspects, the testing systems and techniques provide the ability to rollback to previous versions of testing software. In other examples, the various aspects are applicable to commercial avionics, military embedded systems, and ARINC protocols, as illustrative, non-limiting examples.

In an example, to better identify security vulnerabilities upstream in a product development lifecycle, cyber security practices are integrated into the software development phase. To facilitate automated testing, testing modules are developed and prioritized at a software repository based on cybersecurity attack events. In some implementations, an overlay threat intelligence feed is used to customize test modules for specific threat actors. In an illustrative example, the testing device is loaded with a suite of cybersecurity test modules (e.g., software, scripts, and test data) targeted at ARINC 429, ARINC 717, ARINC 422, ARINC 664, and MIL-STD-1553 systems. An operator of the testing device can select specific tests for an interface to one or more components under test, including cybersecurity vulnerability testing and functional testing. A technical effect of using test modules from such a software repository is uniformity of testing between different avionic system on various commercial or military aircraft or other vehicles or systems. Another technical effect is to provide remote cybersecurity vulnerability testing expertise for distributed testing as compared to performing ad-hoc, individual testing by trained cybersecurity test engineers and to provide a training mechanism for relatively unexperienced cybersecurity engineers. According to some aspects, copies or variations of the software repository and the testing device are implemented at a secure location to support customized testing for military avionics and embedded systems.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple test modules are illustrated and associated with reference numbers 142A, 142B, etc. When referring to a particular one of these test modules, such as test module 142A, the distinguishing letter "A" is used. However, when referring to any arbitrary one of these test modules or to these test modules as a group, the reference number 142 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. For ease of reference herein, such features are generally introduced as "one or more" features, and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating,", "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that is configured to perform testing of vehicle components. While other testing schemes are contemplated, such as functional testing as described further with reference to FIG. 2, the example system 100 is configured for cybersecurity testing. The system 100 includes a testing device 102 that is coupled to a vehicle 190 via one or more networks to enable data communications. For example, the testing device 102 is coupled to the vehicle 190 via one or more wireless networks or buses, one or more wireline networks or buses, or any combination thereof.

The testing device 102 includes a first interface device 120, a second interface device 122, and one or more other interface devices including an Nth interface device 124. The interface devices 120-124 are coupled to a test controller 130. The test controller 130 is coupled to a user interface 132 and to a test module storage 140.

Figure 2:
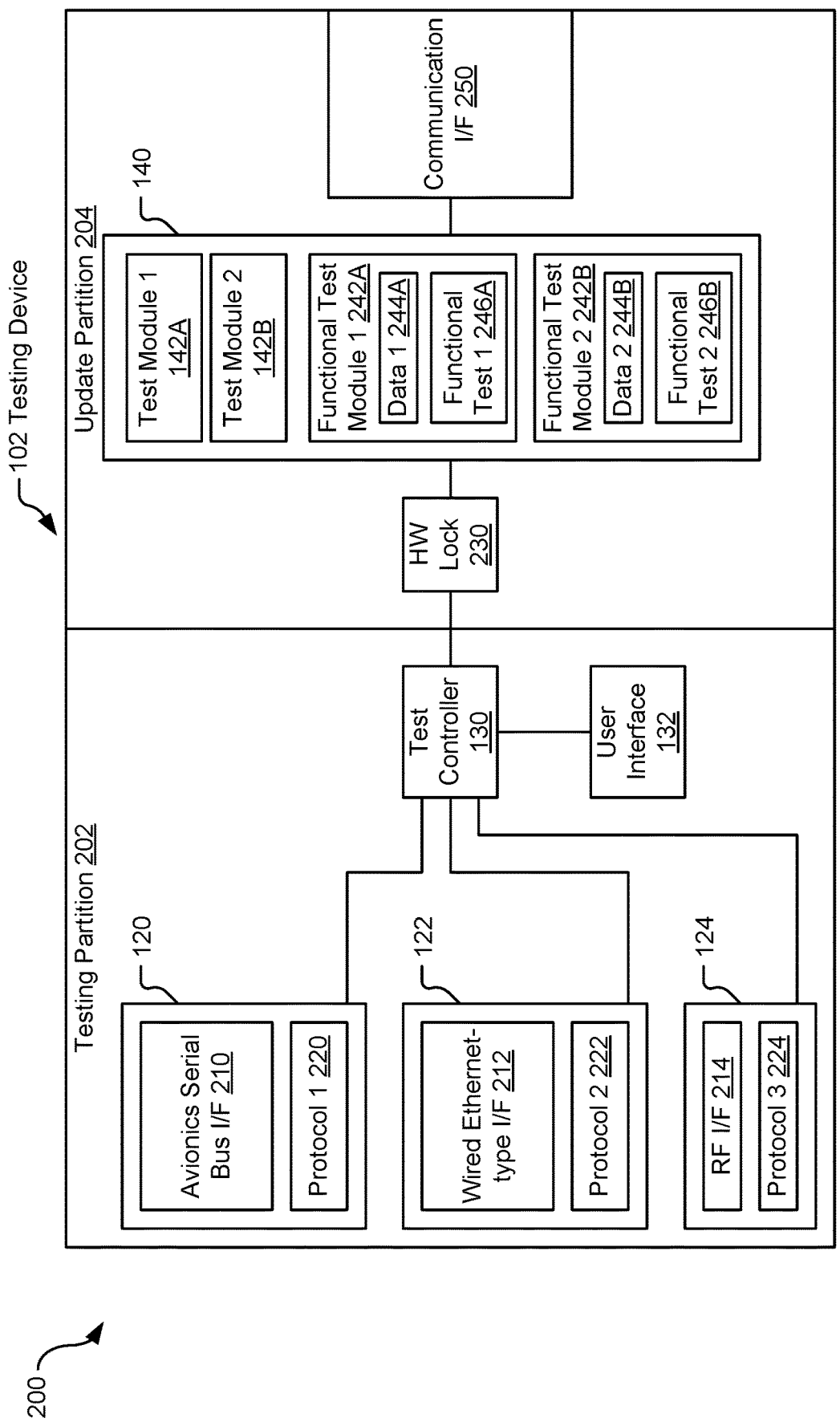
FIG. 2 is a diagram of a particular implementation of the testing device of FIG. 1 in accordance with an embodiment.

In some implementations, such as described further with reference to FIG. 2, one or more of the interface devices 120-124 includes one or more of a radiofrequency interface, a wired ethernet-type interface, or an avionics serial bus interface. The first interface device 120 is configured to enable communication with a first component 192 of the vehicle 190. In an example, the first interface device 120 includes a radiofrequency communication device, such as an antenna, a transponder, or a combination thereof, or a wired network interface, such as an avionics card or field-programmable gate array (FPGA) device that includes a serial bus endpoint or an ethernet-type communication interface, as described further below. Similarly, the second interface device 122 is configured to enable communication with a second component 194 of the vehicle 190. In some implementations, one or more of the interface devices 120-124 are configured to communicate with components of the vehicle 190 via one or more breakout cables that are incorporated in the vehicle 190 for testing purposes during manufacture of the vehicle 190 and that are later removed from the vehicle 190 upon completion of manufacture.

In some implementations, one or more of the interface devices 120-124 are configured to enable communication with one or more additional components of the vehicle 190, such as the Nth interface device 124 configured to enable communication with an Mth component 196. As used herein, N and M are integers greater than two. In some implementations N equals M, while in other implementations N is greater than M or is less than M. Although examples are provided herein that describe testing using the first interface device 120 and the second interface device 122 to communicate data to the first component 192 and the second component 194, respectively, such examples are provided for clarity of explanation and should not be considered limiting.

The test module storage 140 is configured to store one or more test modules 142 that include data 144 to perform vulnerability tests, such as cybersecurity vulnerability tests 146 via the first interface device 120 and the second interface device 122. For example, a first test module 142A in the test module storage 140 includes first data 144A. The first data 144A includes first test data 150 configured to be communicated to the first component 192 of the vehicle 190, second test data 152 configured to be communicated to the second component 194 of the vehicle 190, and in various implementations includes additional test data configured to be communicated to one or more of the components 192-196 of the vehicle 190 to perform a first cybersecurity vulnerability test 146A. A second test module 142B includes second data 144B configured to be communicated to one or more of the components 192-196 of the vehicle 190 to perform a second cybersecurity vulnerability test 146B that is different from the first cybersecurity vulnerability test 146A.

The user interface 132 includes one or more devices, such as one or more buttons, keyboards, pointing devices, displays, speakers, microphones, touch screens, or other devices, or any combination thereof, to enables an operator of the testing device 102 to select and initiate performance of cybersecurity vulnerability testing. The user interface 132 provides a mechanism of simplifying cybersecurity-style attack testing that enables relatively unskilled technicians to run cybersecurity vulnerability testing via the user interface 132 without necessarily having an underlying understanding of the details and procedures involved with each of the test modules 142.

In an example, the test module storage 140 stores a suite of cybersecurity vulnerability tests 146 that are executable via the test controller 130 and the interface devices 120-124 to perform sequenced cybersecurity-style attacks using the interface devices 120-124. In some implementations, the test modules 142 are loaded to the test module storage 140 from an external cybersecurity software repository (e.g., remote from the testing device 102), such as described further with reference to FIG. 3. In an example, the test modules 142 are selected to be loaded from the external software repository based on a testing priority associated with a threat intelligence feed.

As used herein, a cybersecurity-style attack is an attack in which maliciously crafted software payloads are communicated, such as messages that have specific statements that cause remote code execution or that cause unavailability of one or more portions of one or more of the components 192-196. In an illustrative example, a cybersecurity-style attack includes malware exploits that target vehicle specific components, such airplane-specific line-replaceable units (LRUs) in implementations in which the vehicle 190 is an aircraft. Examples of LRUs include, but are not limited to, radios, transponders, sensors, aircraft condition monitoring systems, flight data acquisition units, flight maintenance computers, and aircraft communications and reporting systems. As used herein, a cybersecurity vulnerability test is a test that performs a cybersecurity-style attack, emulates a cybersecurity-style attack, or probes for vulnerabilities that may be exploitable by a cybersecurity-style attack. One example of a cybersecurity vulnerability test includes duplicating a buffer overflow attack by attempting to write data beyond a designated memory region for storage of the data. Another example of a cybersecurity vulnerability attack includes duplicating or emulating a ransomware attack that is based on exploiting one or more potential hardware or software vulnerabilities.

In some implementations, an operator of the testing device 102 selects a suite of test modules to perform cybersecurity vulnerability testing of the vehicle 190, and the test controller 130 is configured to translate user commands received via the user interface 132, such as high-level commands, to select one or more test module 142, such as the test module 142A, to perform an associated cybersecurity vulnerability test 146, e.g., the first cybersecurity vulnerability test 146A, via the interface devices 120-124. Additional details and examples of various implementations of cybersecurity-style attacks are described further with reference to FIG. 2.

In an illustrative implementation, the test controller 130 is responsive to the user interface 132 to select the test module 142A from the test module storage 140 and is responsive to the user interface 132 to cause the first interface device 120 to communicate the first test data 150 to the first component 192 of the vehicle 190. In addition, the test controller 130 causes the second interface device 122 to communicate the second test data 152 to the second component 194 of the vehicle 190 to perform the first cybersecurity vulnerability test 146A associated with the selected test module 142A.

During operation, an operator of the testing device 102 selects, via the user interface 132, one or more test modules 142 to be executed as part of a cybersecurity vulnerability testing of the vehicle 190. In an example, the operator selects the first cybersecurity vulnerability test 146A associated with the test module 142A to be performed.

In response to selection of the test module 142A via the user interface 132, the test controller 130 accesses the selected test module 142A and retrieves the first data 144A, including the first test data 150 and the second test data 152. The test controller 130 controls communication of the first test data 150 to the first interface device 120 to be communicated to the first component 192 and also controls communication of the second test data 152 to the second interface device 122 to be communicated to the second component 194. In an example, transmission of the first test data 150 and the second test data 152 to the first and second components 192 and 194, respectively, of the vehicle 190, respectively, occurs simultaneously (e.g., at least partially overlapping in time). In some implementations, operation of the components under test of the vehicle 190 is monitored to determine an effect of the data communication from the testing device 102. In an illustrative example, the first test data 150 communicated to the first component 192 includes data emulating a stack overflow or other memory overflow attack in which an amount of data transmitted via the first interface device 120 exceeds an allowed amount of data according a communication protocol that is supported by the first component 192. The second test data 152 communicated to the second component 194 is configured to cause the second component 194 to perform one or more functions that contribute to an exploit of the stack overflow or memory attack at the first component 192. For example, an interplay between the first test data 150 affecting the operation of the first component 192 and the second test data 152 the affecting the operation of the second component 194 indicates whether the first and second components 192, 194 are vulnerable to a multi-vector cybersecurity attack.

In some implementations, results of the cybersecurity vulnerability testing are fed back to the testing device 102 and stored and presented to an operator via the user interface 132, are observed by watching operation of one or more systems of the vehicle 190, or a combination thereof. In an example, results are observed as indications appearing at one or more instrumentation light displays or other user interface components of the vehicle 190 that indicate, directly or indirectly, one or more fault conditions arising from a successful cybersecurity vulnerability attack.

Although FIG. 1 depicts the testing device 102 including more than two interface devices 120-124 that provide the technical effect of enabling multiple-vector cybersecurity vulnerability testing that involves multiple components 192-196 of the vehicle 190, in other implementations the testing device 102 includes the first interface device 120 and the second interface device 122 and omits additional interface devices (e.g., omits the Nth interface device 124). Although the test module storage 140 is depicted in the testing device 102, in other implementations part or all of the test module storage 140 is external to the testing device 102.

Although each of the interface devices 120-124, the test controller 130, the user interface 132, and the test module storage 140 are depicted as separate components, in other implementations the described functionality of two or more of the interface devices 120-124, the test controller 130, the user interface 132, and the test module storage 140 is performed by a single component. In some implementations, the interface devices 120-124, the test controller 130, the user interface 132, and the test module storage 140 are each represented in hardware, such as via an application-specific integrated circuit (ASIC) or a field-programmable gate array (FPGA), or the operations described with reference to the elements may be performed by a processor executing computer-readable instructions.

FIG. 2 depicts an illustrative example 200 of the testing device 102. As illustrated, each of the interface devices 120-124 includes one or more of a wireless interface (e.g., radiofrequency interface), a wired interface (e.g, Ethernet, serial, and the like), or an avionics bus interface (e.g., 1553, ARINC, and the like). For example, the first interface device 120 includes a serial bus interface (I/F) 210, illustrated as an avionics serial bus interface 210 for use during testing of an aircraft or one or more LRUs of an aircraft. The second interface device 122 includes a wired ethernet-type interface 212. The Nth interface device 124 includes a radiofrequency (RF) interface 214. Each of the interface devices 120-124 is associated with a corresponding protocol, such as a first protocol 220 associated with the serial bus interface 210, a second protocol 222 associated with the wired ethernet-type interface 212, and a third protocol 224 associated with the radiofrequency interface 214. In an illustrative, non-limiting example, the interface devices 120-124 include communication hardware and protocol stacks corresponding to one or more of: ARINC 429, ARINC 717, ARINC 422, ARINC 664 (e.g., ARINC 664 part 7), ARINC 818, ARINC 1653, MIL-STD-1553, IEEE 802.11, one or more location protocols such as GPS or global navigation satellite system (GNSS), one or more other protocols or interfaces, or any combination thereof.

The testing device 102 includes a testing partition 202 and an update partition 204. As used herein, a "partition" corresponds to a designated region of memory that is logically or physically distinct from other regions of memory, such as one or more designated memory regions of a memory device or one or more designated physical memory devices. In some implementations, a partition differs from other memory regions of a memory system by having a different file system format, different access permissions, different encryption settings, or any combination thereof, as illustrative, non-limiting examples. The testing partition 202 includes the first interface device 120, the second interface device 122, the Nth interface device 124, the user interface 132, and the test controller 130. The update partition 204 includes the test module storage 140, a hardware lock 230, and a communication interface 250. The hardware lock 230 is configurable to selectively enable or prevent an update of the one or more test modules 142 that have been loaded to the testing partition 202. In an example, the hardware lock 230 includes a switch that couples communication lines to enable data transfer when the switch is engaged and that decouples the communication lines to disable data transfer when the switch is disengaged. Engaging (or "locking") the hardware lock 230 includes disengaging the switch, and disengaging (or "unlocking") the hardware lock 230 includes engaging the switch. After one or more test modules have been loaded from the test module storage 140 to the testing partition 202, the hardware lock 230 is manually or electronically set (e.g., engaged) to prevent updates of the test module(s) at the testing partition 202 until after completion of testing that uses the test module. Engaging the hardware lock 230 prevents on-the-fly changes to one or more of the test modules 142 from occurring due to receiving update data from the test module storage 140 during testing, such as in compliance with FAA testing criteria.

In addition to the test modules 142, the test module storage 140 is configured to store one or more additional test modules 242 to enable functional testing of components of the vehicle 190, such as functional testing of the first component 192 and the second component 194 of FIG. 1. To illustrate, the test module storage 140 includes a first functional test module 242A that includes first functional test data 244A executable by the test controller 130 to perform a first functional test 246A. The test module storage 140 also includes a second functional test module 242B that includes second functional test data 244B executable by the test controller 130 to perform a second functional test 246B. In contrast to the "negative" testing corresponding to the cybersecurity vulnerability tests 146 to test for failures or vulnerabilities associated with cyber-attacks, as described with reference to the test modules 142, the functional tests 246 are configured for performance of "positive" testing that tests an operational capability of the vehicle components 192-196 in accordance with normal (e.g., non-cyber attack) operation of the vehicle components 192-196.

Figure 3:
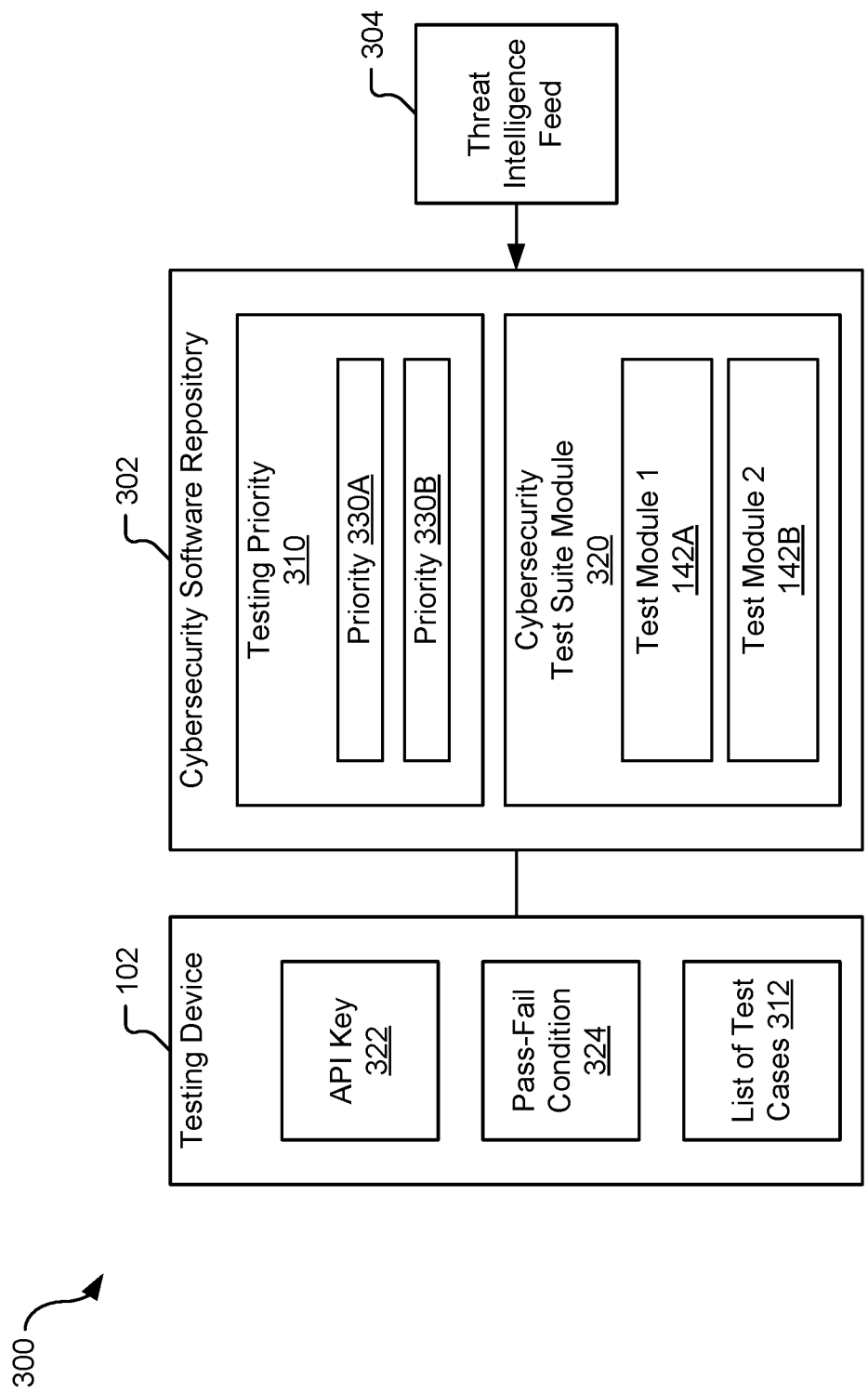
FIG. 3 is a diagram of a system to prioritize and load vulnerability test modules to the testing device of FIG. 1 in accordance with an embodiment.

The communication interface 250 is coupled to the test module storage 140 and is configured to enable loading of the one or more test modules 142 from an external cybersecurity repository, such as described further with reference to FIG. 3. In addition, the communication interface 250 is configured to enable loading of the one or more functional test modules 242, such as from a functional testing software repository.

During operation, the test modules 142 and the functional test modules 242 are loaded to the update partition 204 via the communication interface 250. The test modules 142 and the functional test modules 242 are stored in the test module storage 140.

In some implementations, the test controller 130 receives, from the user interface 132, a selection of one or more test modules from an operator of the testing device 102. In response, the test controller 130 is configured to retrieve one or more of the selected test modules from the test module storage 140 and to provide associated data to be communicated via the interface devices 120-124 to execute the associated test(s). In an illustrative example, in response to selection, at the user interface 132, of the first test module 142A, the test controller 130 retrieves the first test data 150 and the second test data 152 from the test module storage 140. After retrieving the first test data 150 and the second test data 152, the hardware lock 230 is engaged (e.g., set to a locked position that physically interrupts data communication between the testing partition 202 and the update partition 204) to prevent changes to the first test data 150 and the second test data 152 at the testing partition 202. In an illustrative, non-limiting example, the operator of the testing device 102 manually actuates a switch that decouples data bus lines at the testing partition 202 from corresponding data bus lines at the update partition 204.

In some implementations, the first interface device 120 is configured to communicate the first test data 150 to the first component 192 of the vehicle 190 in violation of the first protocol 220 associated with the first interface device 120, and the second interface device 122 is configured to communicate the second test data 152 to the second component 194 in violation of the second protocol 222 associated with the second interface device 122. For example, in an implementation in which the first protocol 220 specifies a payload size (e.g., a largest amount of data that is permitted to be transferred in a data packet) for the avionics serial bus interface 210, communicating the first test data 150 in violation of the first protocol 220 includes transmitting the first test data 150 using a payload size that exceeds the payload size specified by the first protocol 220. In this manner, a cybersecurity-style attack can be emulated that exploits a stack overflow or memory overflow condition of the first component 192. In an implementation in which the second protocol 222 defines an acceptable range of clock frequencies or an allowed packet payload size, transmitting the second test data 152 in violation of the second protocol 222 includes transmission of at least a portion of the second test data 152, using a clock frequency outside of the acceptable range of clock frequencies, using a packet payload size in excess of the allowed payload size, using one or more other violations of the second protocol 222, or combination thereof. In an implementation in which the third protocol 224 defines a range of frequencies or channels permissible for use with the radiofrequency interface 214, transmitting test data in violation of the third protocol 224 includes transmission of cybersecurity test data via one or more frequencies or channels not specified by the third protocol 224, using a packet payload size in excess of an allowed payload size indicated by the third protocol 224, sending wireless signaling traffic that emulates a denial of service (DOS) attack or a global positioning service (GPS) attack, one or more other violations of the third protocol 224, or combination thereof. In this manner, the testing device 102 is configured to perform a cybersecurity-style vulnerability test that emulates exploitation of one or more potential vulnerabilities of one or more components 192-196 of the vehicle 190 arising from violations of the associated protocols 220-224.

In a particular implementation, the test controller 130 receives, from the user interface 132, selection of one or more of the functional tests 246 for performance of functional testing of one or more of the components 192-196. In response, the test controller 130 retrieves the associated data (e.g., the first functional test data 244A associated with the first functional test module 242A) to perform the selected functional test (e.g., the first functional test 246A). The test controller 130 initiates the selected functional test by providing the retrieved functional test data 244 to one or more of the interface devices 120-124 for communication of the functional test data 244 in accordance with the associated protocol 220-224 to perform functional (i.e., non-cybersecurity vulnerability) testing of one or more of the components 192-196.

In some implementations, after completion of one or more of the selected tests, an operator of the testing device 102 manually adjusts a setting of the hardware lock 230 to allow modification of data at the testing partition 202, such as to load a next test module 142 or 242 from the update partition 204 to the testing partition 202 to perform a next test. In other implementations, the hardware lock 230 is adjusted based on control signals from the test controller 130 (instead of being manually set by an operator or the testing device), such as in response to a user input at the user interface 132.

By performing cybersecurity vulnerability tests selected from the test module storage 140, the test controller 130 provides the technical effect of enabling cybersecurity testing at the testing device 102 to determine vulnerability to one or more exploits associated with communications in violation of the associated protocols 220-224. In addition, in the example 200 of FIG. 2, the testing device 102 is configurable to perform non-cybersecurity functional testing via the same interface devices 120-124 functioning in accordance with the associated protocols 220-224. A technical effect is that a variety of testing types (e.g., cybersecurity vulnerability testing and function testing) can be performed using a single testing device 102 rather than requiring multiple testing devices to perform the different testing types. A technical effect of the hardware lock 230 is to enable isolation of the testing partition 202 during testing, preventing modification of testing data at the testing partition 202 while the test is ongoing. Additionally, the communication interface 250 provides a mechanism by which one or more test modules can be loaded to the test module storage 140 from external repositories, such as the cybersecurity software repository as described with reference to FIG. 3, and provides the technical effect of enabling loading standardized test modules from a remote or centralized repository, reducing cost and complexity associated with ad-hoc, individualized testing of components or systems.

Referring to FIG. 3, a particular implementation of a system 300 is depicted that includes the testing device 102, a cybersecurity software repository 302 that includes a cybersecurity test suite module 320, and a threat intelligence feed 304. The cybersecurity test suite module 320 includes one or more test modules, such as the first test module 142A and the second test module 142B. Although a single cybersecurity test suite module 320 is illustrated in the cybersecurity software repository 302, in other implementations the cybersecurity software repository 302 includes multiple cybersecurity test suite modules, each of which includes one or more test modules associated with a corresponding set of cybersecurity attacks, one or more test modules from a test module supplier, such as according to a subscription service, or another logical grouping of test modules.

A testing priority 310 is determined based on the threat intelligence feed 304. For example, the threat intelligence feed 304 includes information associated with known cyber-attacks, such as cyber-attacks detected as being performed by a state-sponsored actor. As an illustration, when a particular state or other actor or organization is known to be performing buffer overflow attacks and is considered to be a relatively high-priority threat, test modules associated with buffer overflow attacks are determined to have a relatively high testing priority as compared to other cybersecurity attacks. In another example, the threat intelligence feed 304 includes information regarding other cybersecurity-style attacks, such as ransomware or other attacks determined to be relevant and occurring at a higher likelihood as compared other cybersecurity attacks. The testing priority 310 indicates, based on the information regarding potential cyber-attacks indicated in the threat intelligence feed 304, a prioritization of cybersecurity test modules that are associated with the potential cyber-attacks and that are to be used for vulnerability testing. The testing priority 310 is used to determine one or more cybersecurity test suite module to be loaded to the testing device 102, such as to select the cybersecurity test suite module 320 to perform cybersecurity vulnerability testing in accordance with the first test module 142A and the second test module 142B. The test modules 142 are selected to be loaded from the external cybersecurity software repository 302 to the testing device 102 based on the testing priority 310, which in turn is based on the threat intelligence feed 304.

In some implementations, the testing priority 310 is a data structure that includes an ordered list of cybersecurity vulnerability tests or test modules that indicates a relative priority of each of the items in the list. In other implementations, the testing priority 310 includes multiple priorities 330 of test cases, such as a priority 330A (e.g., a numerical value) indicating a relative or absolute priority value for the first test module 142A and a priority 330B indicating a relative or absolute priority value for the second test module 142B.

In a particular implementation of operation of the system 300, the testing device 102 receives an application programming interface (API) key 322. The API key 322 is associated with a subscription to a cybersecurity test module from a test provider, such as the cybersecurity test module 320 that includes the first test module 142A. The testing device 102 accesses the cybersecurity test module 320 via the API key 322 to load the cybersecurity test suite module 320 to the testing device 102. The testing device 102 executes testing associated with each of the test modules 142 of cybersecurity test suite module 320, including executing the first test module 142A and executing the second test module 142B. The testing device 102 compares a result of each cybersecurity vulnerability to a pass-fail condition 324. After determining a passing result or a failing result for each of the performed cybersecurity vulnerability tests, the testing device 102 generates an output report, such as via the user interface 132.

In an illustrative example, operation of the system 300 includes creation of multiple cybersecurity avionics test modules 142 (e.g., including the first test module 142A). The testing priority 310 of test cases of the multiple cybersecurity avionics test modules 142 are set based on one or more threat intelligence feeds, such as the threat intelligence feed 304. A list of test cases 312 is generated based on the testing priority 310. One or more of the test modules 142 (e.g., a cybersecurity avionics test module) corresponding to the list of test cases 312, including the first test module 142A, are loaded to the testing device 102. Prior to executing test cases of the one or more avionics test modules 142, the hardware lock 230 is disengaged to enable copying of the test data of the selected test module(s) from the update partition 204 to the testing partition 202 of the testing device 102. After copying the test data to the testing partition 202, the hardware lock 230 is engaged to prevent modification of the test data in the testing partition 202 until after performance of the tests has completed.

In some aspects, the testing device 102 is used in conjunction with a subscription-based model in which one or more API keys, such as the API key 322, can be provided to subscribers of one or more cybersecurity test suite modules that are available at the cybersecurity software repository 302. The testing priority 310 is determined based upon one or more threat intelligence feeds, such as the threat intelligence feed 304, to provide testing priority to known vulnerability attacks that are considered to have a relatively high probability of occurrence or relatively high damage potential in the event of a successful attack. The testing priority 310 enables the testing device 102, or an operator of the testing device 102, to determine the list of test cases 312 to structure a sequence of cybersecurity vulnerability testing associated with the threat intelligence feed 304 and accessible via the subscription to the subscribed cybersecurity test suite associated with the API key 322. In some implementations, additional API keys associated with other cybersecurity test modules are selectable, such as API keys that are provided with additional subscriptions, enabling an operator of the testing device 102 to select from among multiple providers of cybersecurity test modules, multiple types of cybersecurity testing, or a combination thereof.

Figure 4:
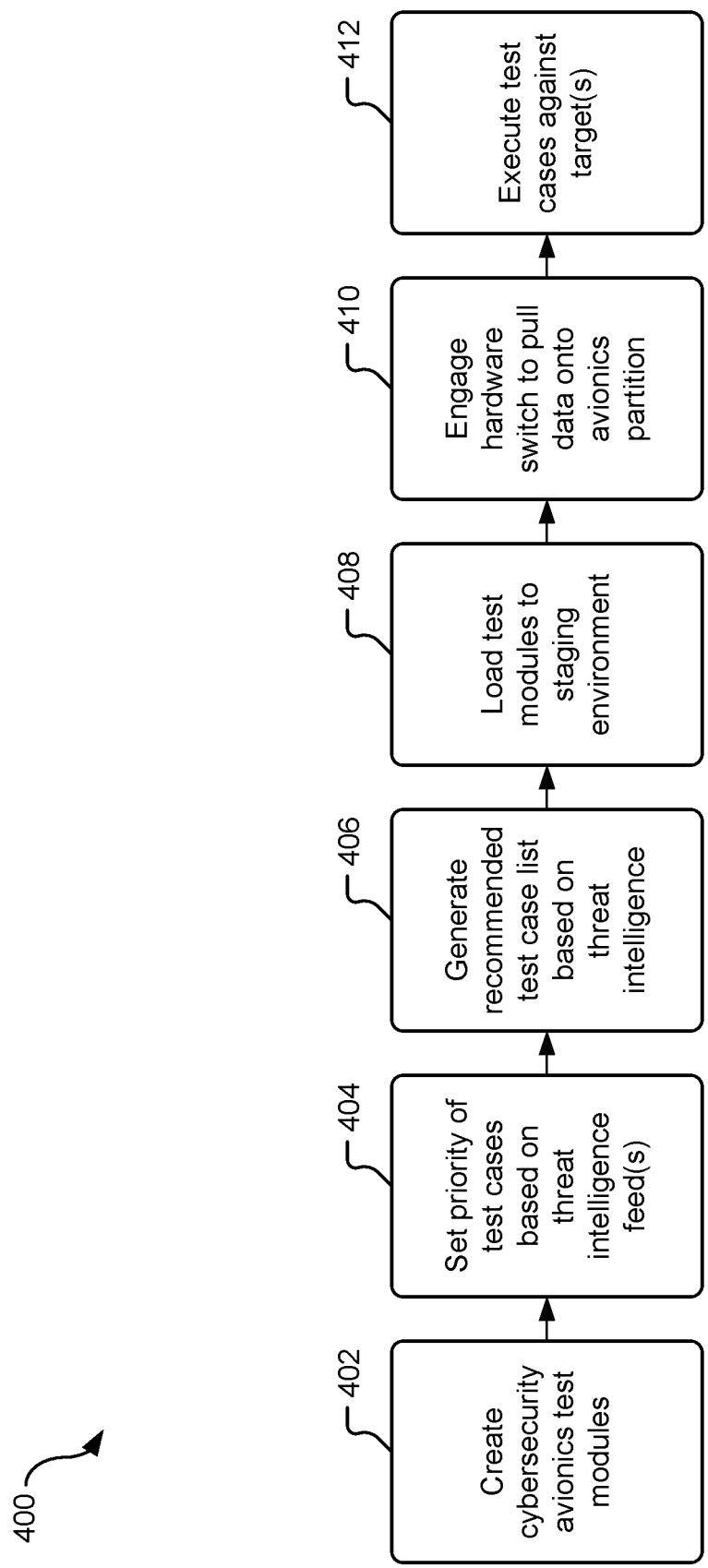
FIG. 4 is a diagram that illustrates a flow chart of an example of a method of vehicle vulnerability testing that can be performed by the system of FIG. 3 in accordance with an embodiment.

FIG. 4 depicts an example of a method 400 that is performed in association with the testing device 102 in some implementations. The method 400 includes, at 402, creating one or more cybersecurity avionics test modules, such as the first test module 142A or the second test module 142B. The method 400 includes, at 404, setting a priority of test cases based on one or more threat intelligence feeds, such as the testing priority 310 that is set based on the threat intelligence feed 304. The method 400 includes, at 406, generating a recommended test case list based on threat intelligence. In an example, the list of test cases 312 is generated based on the testing priority 310, which is based on the threat intelligence feed 304.

The method 400 includes, at 408, loading the test modules to a staging environment. In an example, the staging environment corresponds to the update partition 204 illustrated in FIG. 2, loaded from the cybersecurity software repository 302 via the communication interface 250.

The method 400 includes, at 410, engaging a hardware switch to pull data onto an avionics partition, at 410. In in example, engaging the hardware switch is performed by manually configuring the hardware lock 230 to enable to the test controller 130 to retrieve the first data 144A of the first test module 142A from the update partition 204 to the testing partition 202 in response to a determination to load the first test module 142A.

The method 400 includes, at 412, executing test cases against one or more targets. To illustrate, the test controller 130 executes one or more of the retrieved test modules to perform cybersecurity vulnerability testing of one or more of the components 192-196 of the vehicle 190 via communication of test data using one or more of the interface devices 120-124.

Figure 5A:
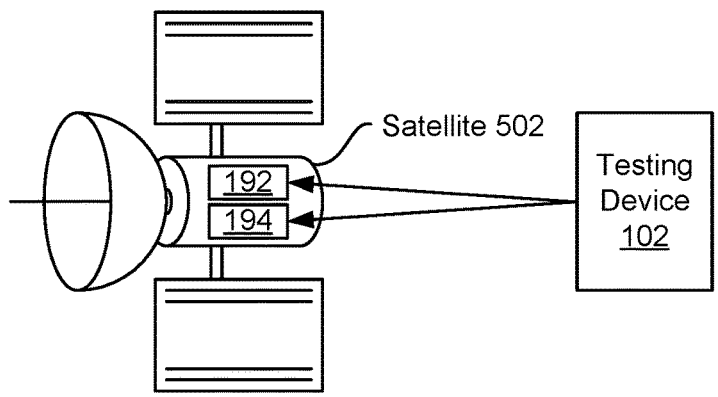
FIG. 5A is a diagram depicting another example of a system that includes the testing device of FIG. 1 in accordance with an embodiment.
Figure 5B:
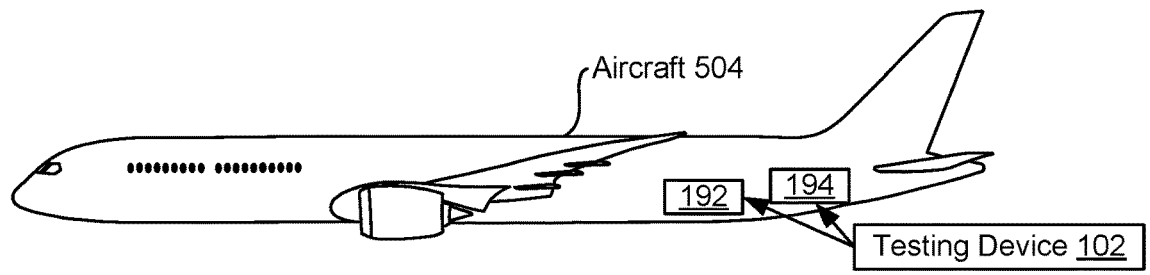
FIG. 5B is a diagram depicting another example of a system that includes the testing device of FIG. 1 in accordance with an embodiment.
Figure 5C:
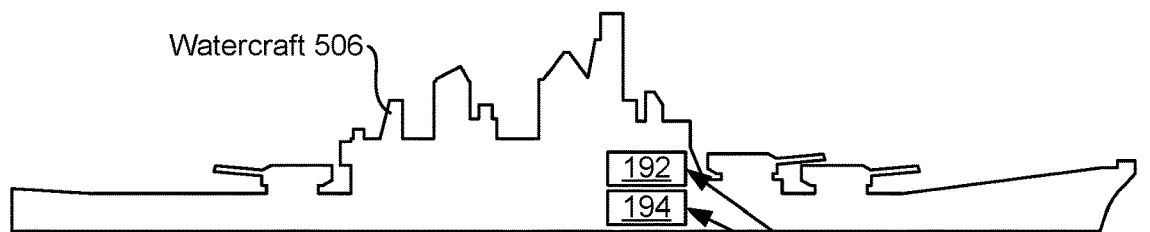
FIG. 5C is a diagram depicting another example of a system that includes the testing device of FIG. 1 in accordance with an embodiment.
Figure 5D:
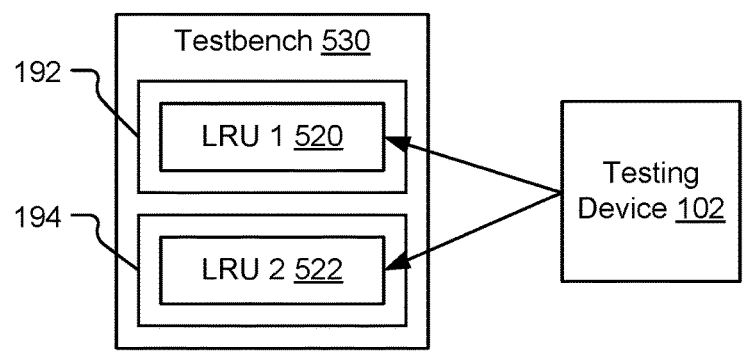
FIG. 5D is a diagram depicting another example of a system that includes the testing device of FIG. 1 in accordance with an embodiment.

FIGS. 5A-5D depicts multiple examples of systems that include the testing device 102 in communication with the first component 192 and the second component 194 in various implementations. FIG. 5A depicts the testing device 102 performing cybersecurity vulnerability testing of the components 192, 194 in a spacecraft, such as a satellite 502. FIG. 5B depicts the testing device 102 performing cybersecurity vulnerability testing of the components 192, 194 in an aircraft 504. FIG. 5C depicts the testing device 102 performing cybersecurity vulnerability testing of the components 192, 194 in a watercraft 506. FIG. 5D depicts an implementation in which the testing device 102 performs cybersecurity vulnerability testing of the components 192, 194 at a testbench 530 instead of in a vehicle. As illustrated, the first component 192 includes a first LRU 520 and the second component 194 includes a second LRU 522. As used herein, a "testbench" includes one or more hardware devices, field programmable gate arrays, processors, servers, or any combination thereof, that enable testing of one or more of the components 192, 194 or testing of software of one or more of the components 192, 194 prior to integration of the components 192, 194 into the vehicle 190. In an illustrative, non-limiting example, a testbench includes an emulator configured to emulate an operating environment of one or more of the components 192, 194 for testing purposes.

Although FIGS. 5A-5D depict testing of vehicle components at the respective vehicles 502-506 and at the testbench 530, in other implementations the testing device 102 tests electronic components other than in vehicles or at a testbench. For example, in some implementations the testing device 102 is used to test the components 192, 194 that are implemented at a stationary structure (e.g., an air traffic control tower).

Figure 6:
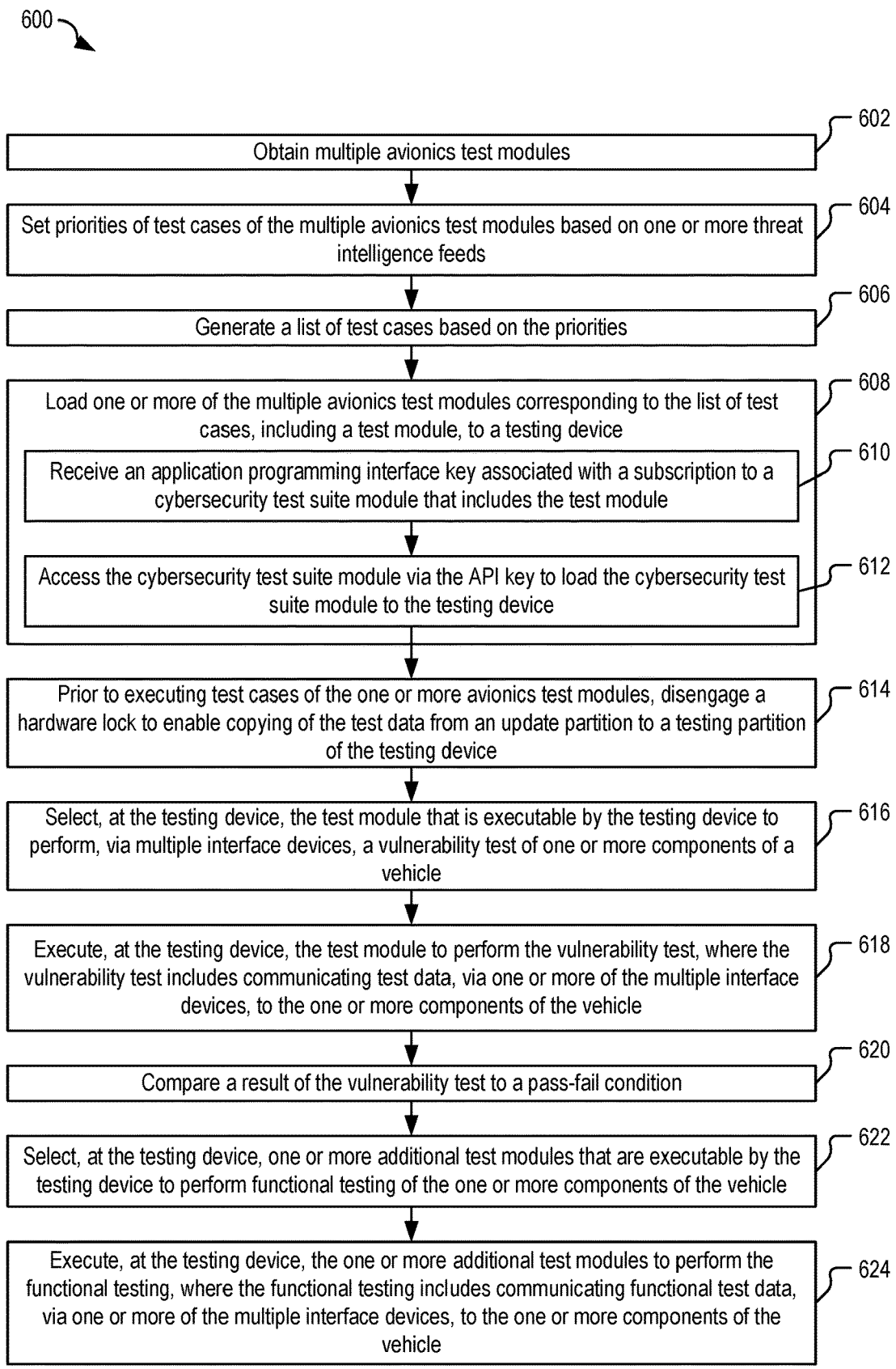
FIG. 6 is a diagram that illustrates a flow chart of an example of a method of vehicle vulnerability testing that can be performed by the testing device of FIG. 1 in accordance with an embodiment.

FIG. 6 depicts an illustrative implementation of a method 600 of vehicle testing. In an example, one or more elements of the method 600 is performed by the testing device 102 in isolation or as part of the system 300 of FIG. 3. Although the method 600 is described in conjunction with avionics testing, in other implementations the method 600 is instead performed in conjunction with other vehicle or non-vehicle testing, such as described with reference to FIGS. 5A, 5C, and 5D.

The method 600 includes, at 602, obtaining multiple avionics test modules that include a test module, such as the first test module 142A. The method 600 includes, at 604, setting priorities of test cases of the multiple avionics test modules based on one or more threat intelligence feeds, such as the testing priority 310 of test cases of the cybersecurity avionics test modules 142 based on the threat intelligence feed 304. The method 600 includes, at 606, generating a list of test cases 312 based on the priorities. For example, the list of test cases 312 is generated based on the testing priority 310.

The method 600 includes, at 608, loading one or more of the multiple avionics test modules corresponding to the list of test cases (e.g., including the test module 142A) to a testing device, such as the testing device 102. In an illustrative example, the one or more test modules 142 are loaded from the external cybersecurity software repository 302 to the testing device 102, where the one or more test modules 142 are selected to be loaded based on the testing priority 310, and the testing priority 310 is based on the threat intelligence feed 304.

In a particular implementation, loading the test modules to the testing device includes, at 610, receiving an application programming interface key (e.g., the API key 322) associated with a subscription to a cybersecurity test suite module, such as the cybersecurity test module 320 that includes the test module 142A. In the particular implementation, loading the test modules to the testing device also includes, at 612, accessing the cybersecurity test suite module via the API key to load the cybersecurity test suite module to the testing device.

The method 600 includes, at 614, prior to executing test cases of the one or more avionics test modules, disengaging a hardware lock (e.g., disengaging the hardware lock 230) to enable copying of the test data from an update partition (e.g., the update partition 204) to a testing partition (e.g., the testing partition 202) of the testing device. After copying the test data from the update partition to the testing partition, the hardware lock is engaged to prevent data transfer from the update partition to the testing partition.

The method 600 includes, at 616, selecting, at the testing device, a test module that is executable by the testing device to perform, via multiple interface devices, a vulnerability test of one or more components of a vehicle. In an illustrative example, the testing device 102 selects the test module 142A that is executable by the testing device 102 to perform, via the interface devices 120-124, the first cybersecurity vulnerability test 146A of one or more components 192-196 of the vehicle 190.

The method 600 includes, at 618, executing, at the testing device, the test module to perform the vulnerability test, where the vulnerability test includes communicating test data, via one or more of the multiple interface devices, to the one or more components of the vehicle. In some implementations, communicating the test data includes initiating transmission via at least two of: a radiofrequency interface (e.g., the radiofrequency interface 214); a wired ethernet-type interface (e.g., the wired ethernet-type interface 212); or a serial bus interface (e.g., the serial bus interface 210). In some implementations, communicating the test data to the one or more components of the vehicle violates one or more associated protocols (e.g., one or more of the protocols 220-224) of the one or more of the multiple interface devices. In an illustrative example, the vulnerability test is performed during product development of the one or more components, during certification testing of the one or more components, or both.

The method 600 includes, at 620, comparing a result of the vulnerability test to a pass-fail condition. In a non-limiting example, the testing device 102 compares test results to the pass-fail condition 324 and generates a report indicative of success or failure of the vulnerability test.

The method 600 includes, at 622, selecting, at the testing device, one or more additional test modules that are executable by the testing device to perform functional testing of the one or more components of the vehicle, such as the additional test modules 242 selected responsive to operator input received via the user interface 132.

The method 600 includes, at 624, executing, at the testing device, the one or more additional test modules to perform the functional testing, where the functional testing includes communicating functional test data (e.g., functional test data 244), via one or more of the multiple interface devices, to the one or more components of the vehicle.

In some implementations, the method 600 is performed by multiple interoperating devices or systems. In some examples, the multiple cybersecurity test modules and the multiple functional test modules are created by one or more cybersecurity testing vendors, component manufactures, governmental or regulatory agencies, other testing providers, or any combination thereof. In some examples, generating the list of test cases based on the priorities, maintaining one or more software repositories, and providing the API key to subscribers to access test modules in the software repositories is performed by one or more cybersecurity testing vendors, governmental or regulatory agencies, other testing providers, or any combination thereof. However, in other implementations, every element of the method 600 is performed by a single entity, such as a vehicle manufacturer.

In some implementations, one or more elements of the method 600 are omitted. As an illustrative, non-limiting example, in an implementation in which the test modules are generated and prioritized by one or more external vendors or suppliers, operations associated with blocks 602-612 are performed by the external vendors or suppliers and are omitted from the method 600. In another illustrative, non-limiting example, in an implementation in which the testing device omits the hardware lock 230, operations associated with block 614 of the method 600 are omitted. In another illustrative, non-limiting example, in an implementation in which functional testing is not performed, operations associated with blocks 622 and 624 are omitted from the method 600.

Aspects of the disclosure can be described in the context of an example of a vehicle. A particular example of the vehicle 190 is an aircraft 700 as shown in FIG. 7.

Figure 7:
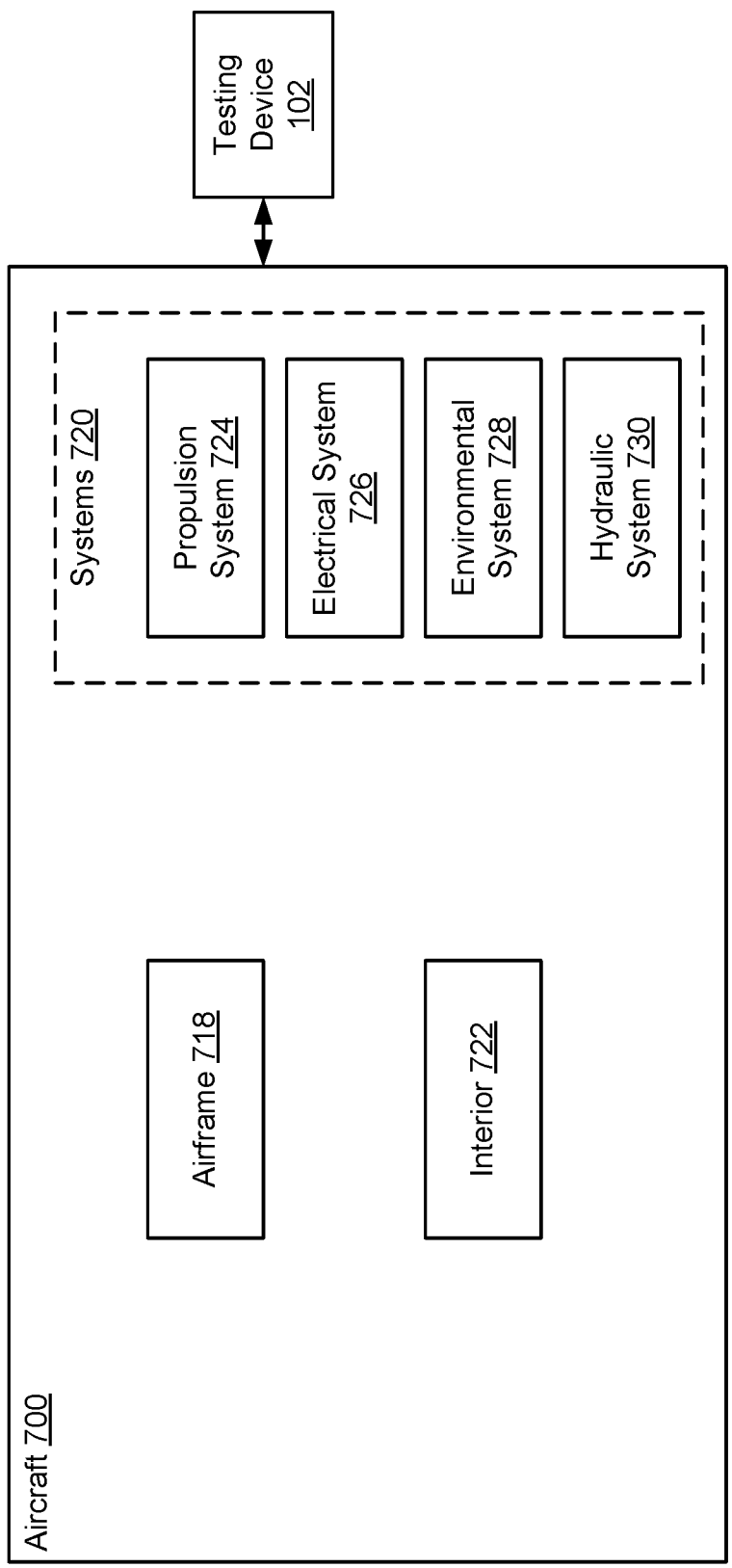
FIG. 7 is a diagram that illustrates an example of an aircraft including multiple system components that can be tested by the testing device of FIG. 1 in accordance with an embodiment.

In the example of FIG. 7, the aircraft 700 includes an airframe 718 with a plurality of systems 720 and an interior 722. Examples of the plurality of systems 720 include one or more of a propulsion system 724, an electrical system 726, an environmental system 728, and a hydraulic system 730. Any number of other systems may be included. One or more of the systems 720 includes one or more of the components 192-196 described in FIG. 1 and is accessible for cybersecurity vulnerability testing by the testing device 102.

Figure 8:
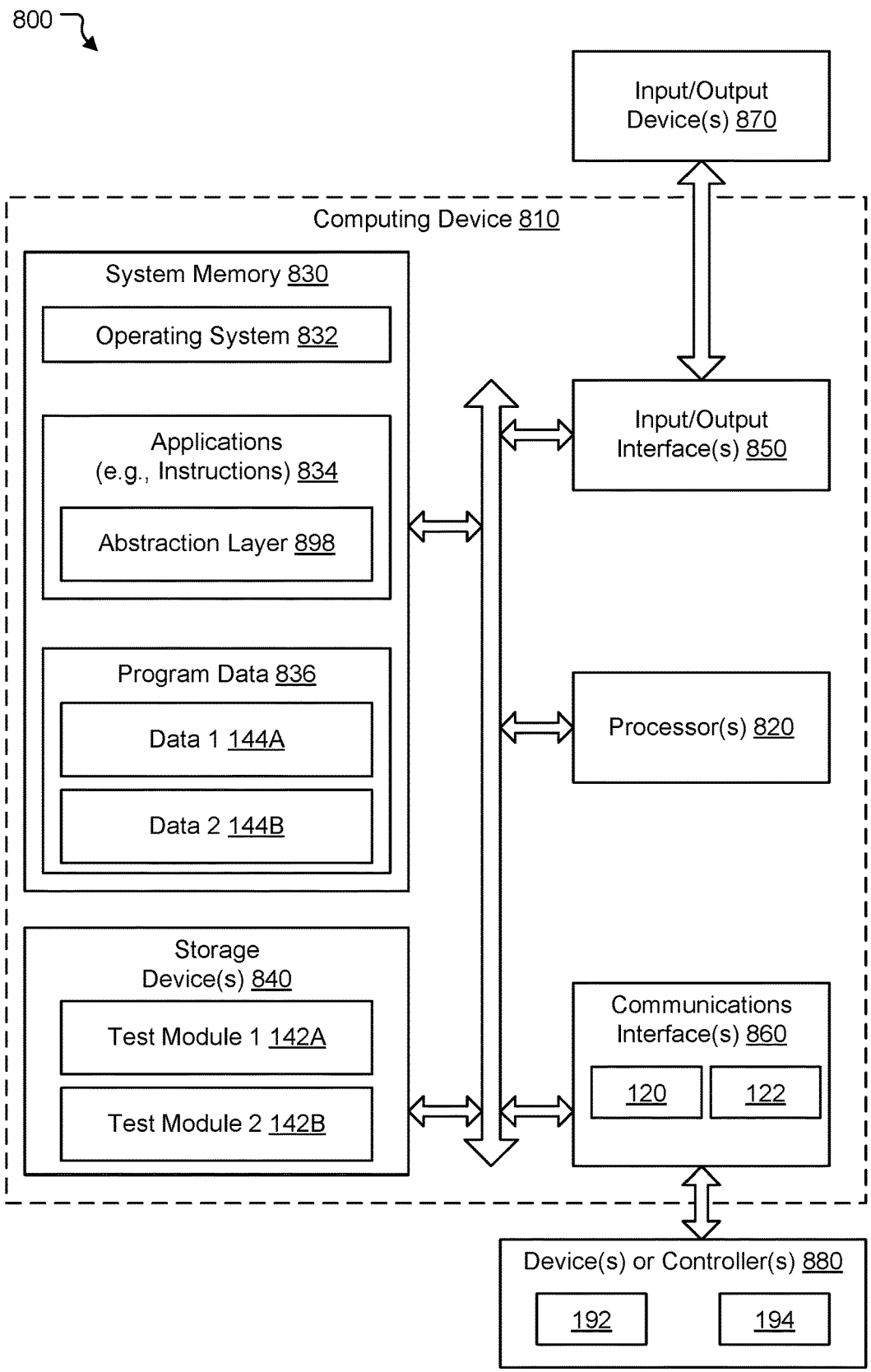
FIG. 8 is a block diagram of a computing environment including a computing device configured to support aspects of computer-implemented methods and computer-executable program instructions (or code) according to an embodiment of the present disclosure.

FIG. 8 is a block diagram of a computing environment 800 including a computing device 810 configured to support aspects of computer-implemented methods and computer-executable program instructions (or code) according to the present disclosure. For example, the computing device 810, or portions thereof, is configured to execute instructions to initiate, perform, or control one or more operations described with reference to FIGS. 1-7. In a particular implementation, the computing device 810 corresponds to the testing device 102 of FIG. 1.

The computing device 810 includes one or more processors 820. The processor(s) 820 are configured to communicate with system memory 830, one or more storage devices 840, one or more input/output interfaces 850, one or more communications interfaces 860, or any combination thereof. The system memory 830 includes volatile memory devices (e.g., random access memory (RAM) devices), nonvolatile memory devices (e.g., read-only memory (ROM) devices, programmable read-only memory, and flash memory), or both. The system memory 830 stores an operating system 832, which may include a basic input/output system for booting the computing device 810 as well as a full operating system to enable the computing device 810 to interact with users, other programs, and other devices. The system memory 830 stores system (program) data 836, such as the first data 144A and the second data 144B of FIG. 1.

The system memory 830 includes one or more applications 834 (e.g., sets of instructions) executable by the processor(s) 820. As an example, the one or more applications 834 include instructions executable by the processor(s) 820 to initiate, control, or perform one or more operations described with reference to FIGS. 1-7. To illustrate, the one or more applications 834 include an abstraction layer 898 having instructions executable by the processor(s) 820 to initiate, control, or perform one or more operations described with reference to the test controller 130, such as receiving user input from a user interface, selecting and loading test modules based on the user input, and configuring, scheduling, and sending test data to the interface devices 120, 122 to perform testing.

In a particular implementation, the system memory 830 includes a non-transitory, computer readable medium storing the instructions that, when executed by the processor(s) 820, cause the processor(s) 820 to initiate, perform, or control operations to perform cybersecurity vulnerability testing, such as via execution of the abstraction layer 898. The operations include selecting a test module (e.g., the test module 142A) that is executable to perform, via multiple interface devices (e.g., the interface devices 120, 122), a cybersecurity vulnerability test (e.g., the first cybersecurity vulnerability test 146A) of one or more components of a vehicle (e.g., the components 192, 194 of the vehicle 190). The operations also include executing the test module to perform the cybersecurity vulnerability test, where the cybersecurity vulnerability test includes communicating test data (e.g., the first test data 150 and the second test data 152), via one or more of the multiple interface devices, to the one or more components of the vehicle. In some implementations, the operations further include selecting one or more additional test modules (e.g., test modules 242) that are executable to perform functional testing of the one or more components of the vehicle, and executing the one or more additional test modules to perform the functional testing, where the functional testing includes communicating functional test data (e.g., functional test data 244), via one or more of the multiple interface devices, to the one or more components of the vehicle.

In some implementations, the one or more storage devices 840 correspond to the test module storage 140 and include nonvolatile storage devices, such as magnetic disks, optical disks, or flash memory devices. In a particular example, the storage devices 840 include both removable and non-removable memory devices. The storage devices 840 are configured to store an operating system, images of operating systems, applications (e.g., one or more of the applications 834), and program data (e.g., the program data 836), including the first test module 142A and the second test module 142B. In a particular aspect, the system memory 830, the storage devices 840, or both, include tangible computer-readable media. In a particular aspect, one or more of the storage devices 840 are external to the computing device 810.

The one or more input/output interfaces 850 that enable the computing device 810 to communicate with one or more input/output devices 870 to facilitate user interaction. For example, in some implementations the one or more input/output interfaces 850 include a display interface, an input interface, or both. For example, the input/output interface 850 is adapted to receive input from a user, to receive input from another computing device, or a combination thereof. In some implementations, the input/output interface 850 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, N.J.). In some implementations, the input/output device 870 includes one or more user interface devices and displays, such as the user interface 132, including some combination of buttons, keyboards, pointing devices, displays, speakers, microphones, touch screens, and other devices.

The processor(s) 820 are configured to communicate with devices or controllers 880, such as the first component 192 and the second component 194 via the one or more communications interfaces 860. In an example, the one or more communications interfaces 860 includes a network interface or other interface device, such as the first interface device 120 and the second interface device 122, one or more other devices, or any combination thereof.

In conjunction with the described systems and methods, an apparatus for vehicle testing is disclosed that includes means for selecting, at a testing device, a test module that is executable by the testing device to perform, via multiple interface devices, a vulnerability test of one or more components of a vehicle. In some implementations, the means for selecting the test module corresponds to the test controller 130, the testing device 102, the computing device 810, the processor(s) 820, one or more other circuits or devices configured to select a test module, or a combination thereof.

The apparatus also includes means for executing, at the testing device, the test module to perform the vulnerability test, where the vulnerability test includes communicating test data, via one or more of the multiple interface devices, to the one or more components of the vehicle. In some implementations, the means for executing the test module to perform the vulnerability test includes the test controller 130, one or more of the interface devices 120-124, the testing device 102, the computing device 810, the processor(s) 820, one or more other devices configured to perform the vulnerability test, or a combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-8. In some implementations, part or all of one or more of the operations or methods of FIGS. 1-8 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A testing device comprising:
   an update partition comprising a test module storage configured to store one or more test modules corresponding with test data;
   a testing partition comprising:
   a first interface device configured to enable communication with a first component of a vehicle;
   a second interface device configured to enable communication with a second component of the vehicle;
   a user interface; and
   a test controller responsive to the user interface to select a test module from the test module storage causing the selected test module to be loaded to the testing partition and to cause the first interface device to communicate first test data of the test data to the first component of the vehicle and to cause the second interface device to communicate second test data of the test data to the second component of the vehicle to perform a vulnerability test associated with the selected test module; and a hardware lock configured to selectively enable copying of the test data from the update partition to the testing partition of the testing device prior to the vulnerability test when the hardware lock is disengaged and prevent an update of the loaded selected test module during performance of the vulnerability test by decoupling communication lines between the update partition and the testing partition when the hardware lock is engaged.

2. The testing device of claim 1, wherein the first interface device includes one or more of a radiofrequency interface, a wired Ethernet-type interface, or an avionics bus interface.

3. The testing device of claim 2, wherein the first interface device is configured to operate in accordance with one or more of an ARINC 429-type data transfer standard or a MIL-SPEC-1553 serial data bus standard.

4. The testing device of claim 1, wherein the vulnerability test is a cybersecurity vulnerability test, the testing device further comprising a communication interface that is coupled to the test module storage and that is configured to enable loading of the one or more test modules from a cybersecurity software repository that is remote from the testing device.

5. The testing device of claim 4, wherein the test modules are selected to be loaded from the cybersecurity software repository based on a testing priority, the testing priority based on a threat intelligence feed.

6. The testing device of claim 1, the test module storage further configured to store one or more additional test modules to enable functional testing of the first component of the vehicle.

7. The testing device of claim 1, wherein the first interface device is configured to communicate the first test data to the first component in violation of a protocol associated with the first interface device.

8. The testing device of claim 1, wherein at least one of the first component and the second component includes a line-replaceable unit at a testbench.

9. The testing device of claim 1, wherein the hardware lock is configured to selectively enable an update of the one or more test modules by coupling the communication lines between the update partition and the testing partition.

10. The testing device of claim 9, wherein the hardware lock includes a switch that couples the communication lines to enable data transfer when the switch is engaged and that decouples the communication lines to disable data transfer when the switch is disengaged.

11. A method of vehicle testing, the method comprising:
selecting, at a testing device comprising an update partition and a testing partition, a test module from a plurality of test modules in the update partition that is executable by the testing device to perform, via multiple interface devices in the testing partition, a vulnerability test of one or more components of a vehicle when the test module is loaded to the testing partition;
enabling, by disengaging a hardware lock, copying of test data from the update partition to the testing partition of the testing device prior to the vulnerability test;
preventing, by executing the hardware lock, an update of the loaded test module by decoupling communication lines between the update partition and the testing partition during performance of the vulnerability test; and
executing, at the testing device, the loaded test module to perform the vulnerability test, wherein the vulnerability test includes communicating the test data, via one or more of the multiple interface devices, to the one or more components of the vehicle.

12. The method of claim 11, wherein communicating the test data includes initiating transmission via at least two of: a radiofrequency interface; a wired Ethernet-type interface; or a serial bus interface.

13. The method of claim 11, further comprising loading, from cybersecurity software repository that is remote from the testing device, one or more test modules to the testing device, wherein the one or more test modules are selected to be loaded based on a testing priority, the testing priority based on a threat intelligence feed.

14. The method of claim 11, further comprising: selecting, at the testing device, one or more additional test modules that are executable by the testing device to perform functional testing of the one or more components of the vehicle; and executing, at the testing device, the one or more additional test modules to perform the functional testing, wherein the functional testing includes communicating functional test data, via one or more of the multiple interface devices, to the one or more components of the vehicle.

15. The method of claim 11, wherein communicating the test data to the one or more components of the vehicle violates one or more associated protocols of the one or more of the multiple interface devices.

16. The method of claim 11, further comprising:
receiving an application programming interface (API) key associated with a subscription to a cybersecurity test suite module that includes the test module;
accessing the cybersecurity test suite module via the API key to load the cybersecurity test suite module to the testing device; and
comparing a result of the vulnerability test to a pass-fail condition.

17. The method of claim 11, further comprising:
obtaining multiple avionics test modules that include the test module;
setting priorities of test cases of the multiple avionics test modules based on one or more threat intelligence feeds;
generating a list of test cases based on the priorities;
loading one or more of the multiple avionics test modules corresponding to the list of test cases, including the test module, to the testing device; and
prior to executing test cases of the loaded avionics test modules, disengaging the hardware lock.

18. The method of claim 11, wherein the vulnerability test is performed during product development of the one or more components, during certification testing of the one or more components, or both.

19. A computer-readable storage device comprising instructions, that when executed, cause one or more processors to perform operations comprising:
selecting, at a testing device comprising an update partition and a testing partition, a test module from a plurality of test modules in the update partition;
loading the selected test module to the testing partition;
copying of test data from the update partition to the testing partition of the testing device prior to a vulnerability test when a lock is disengaged;
bypass an update of the loaded selected test module during performance of the vulnerability test when the lock is engaged;

causing the loaded selected test module to perform, via multiple interface devices in the testing partition, the vulnerability test of one or more components of a vehicle; and executing the loaded selected test module to perform the vulnerability test, wherein the vulnerability test includes communicating the test data, via one or more of the multiple interface devices, to the one or more components of the vehicle.

20. The computer-readable storage device of claim 19, the operations further comprising:

selecting one or more additional test modules that are executable to perform functional testing of the one or more components of the vehicle; and executing the one or more additional test modules to perform the functional testing, wherein the functional testing includes communicating functional test data, via one or more of the multiple interface devices, to the one or more components of the vehicle.

* * * * *